Figure 1:
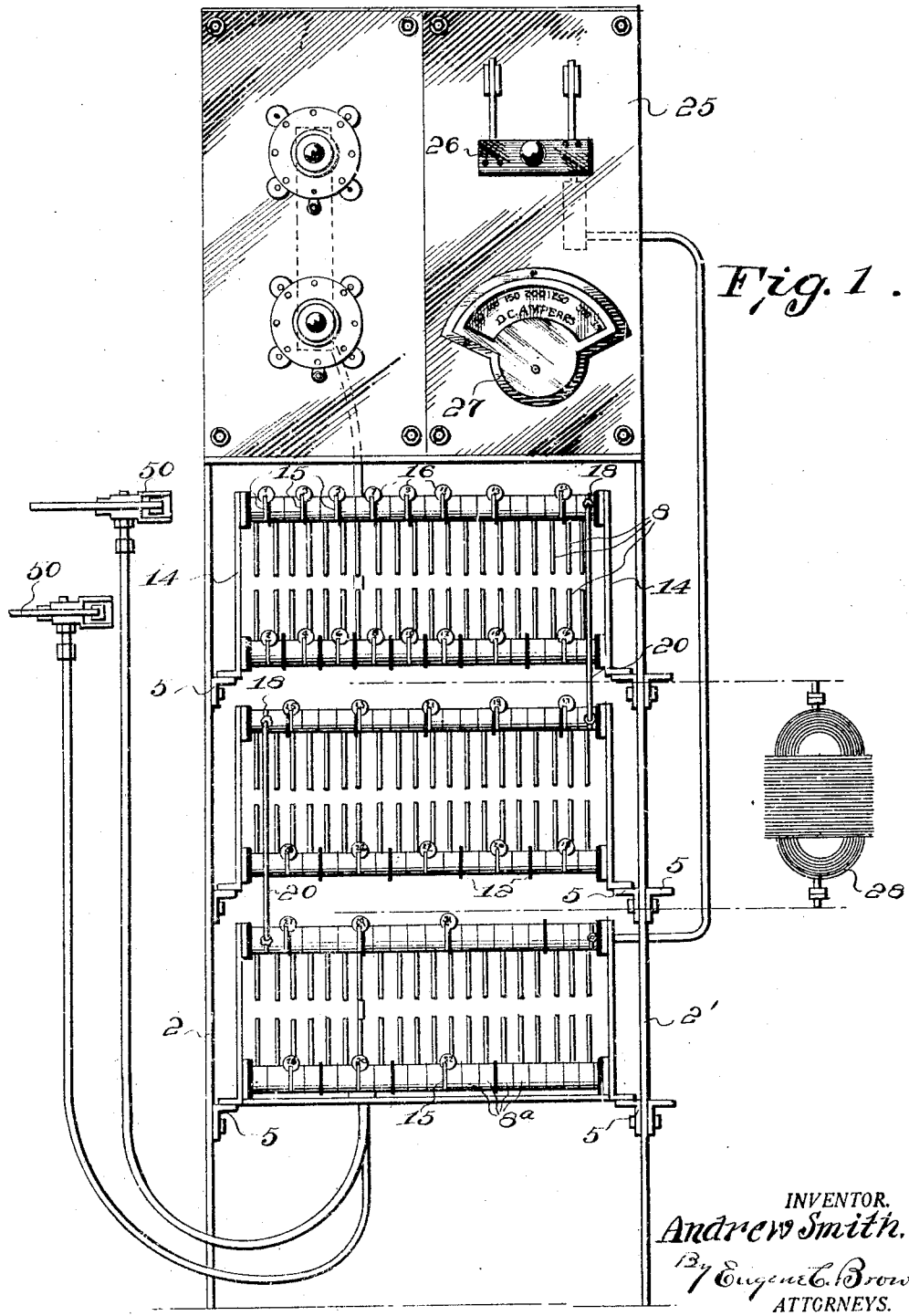

Dec. 20, 1927.　　　　　　　　　　　　　　　　1,653,070
A. SMITH
RESISTANCE REGULATING APPARATUS FOR ELECTRIC WELDING
Filed April 20, 1925　　　　3 Sheets-Sheet 1

INVENTOR.
Andrew Smith.
By Eugene C. Brown
ATTORNEYS.

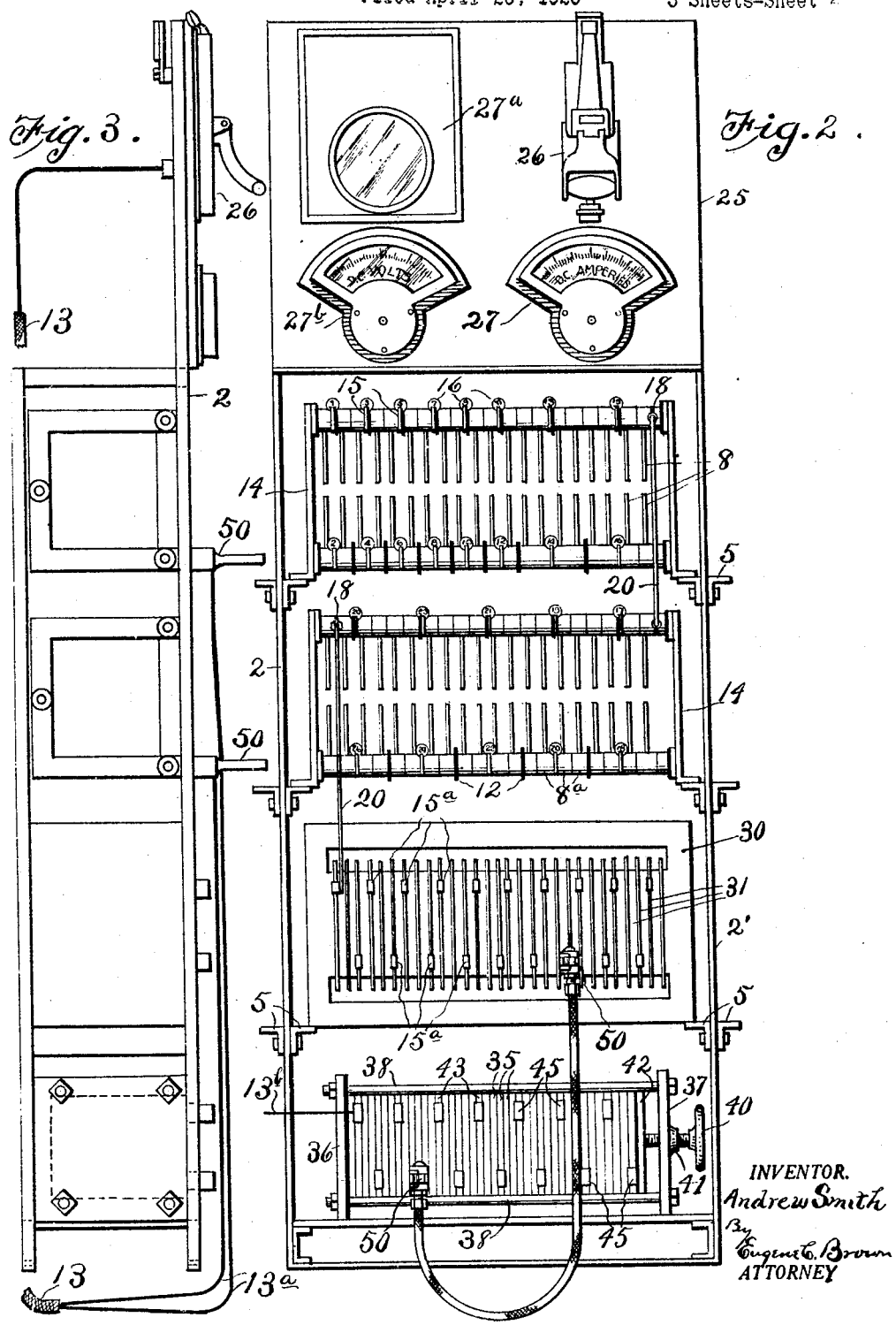

Dec. 20, 1927.
A. SMITH
RESISTANCE REGULATING APPARATUS FOR ELECTRIC WELDING
Filed April 20, 1925    3 Sheets-Sheet 3
1,653,070
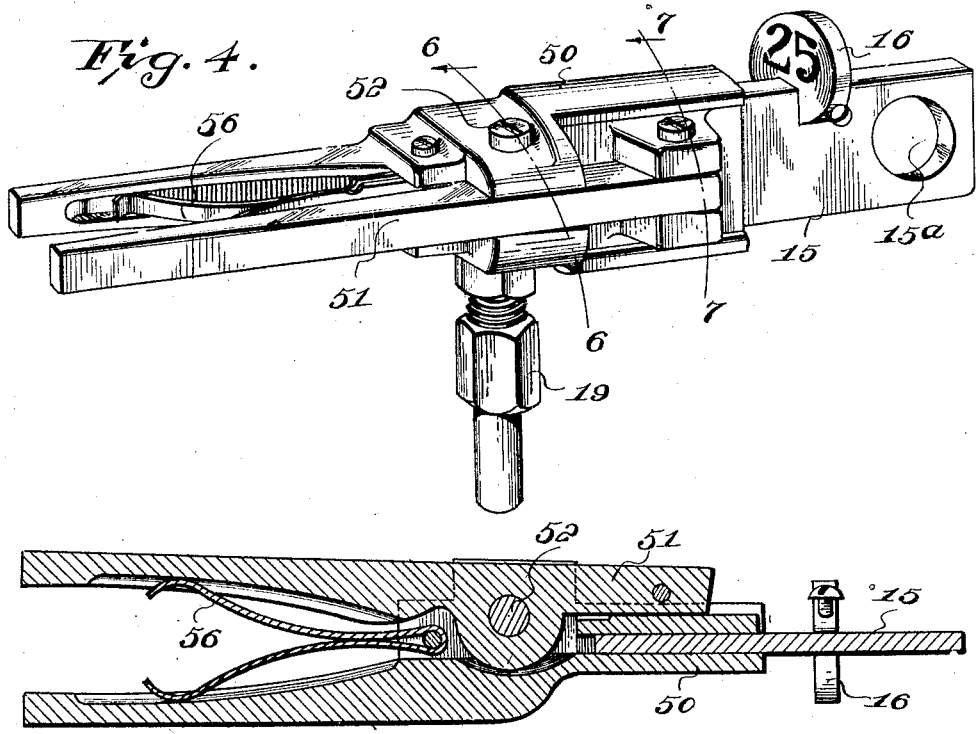
Fig. 4.
Fig. 5.
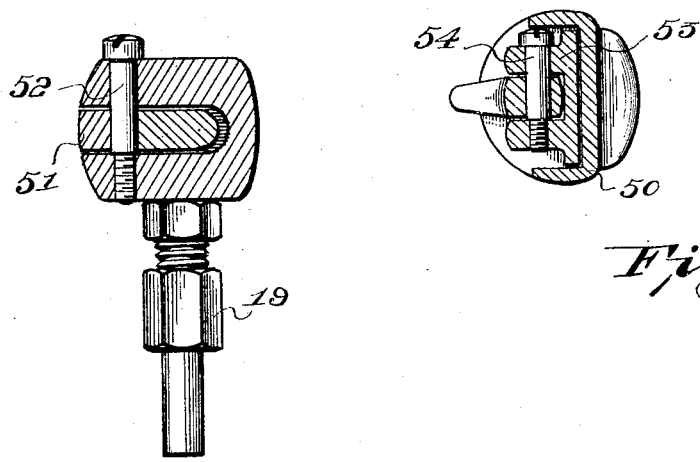
Fig. 6.
Fig. 7.
INVENTOR.
Andrew Smith.
BY Eugene E. Brown
ATTORNEYS.

Patented Dec. 20, 1927.

1,653,070

UNITED STATES PATENT OFFICE.

ANDREW SMITH, OF SAN MATEO, CALIFORNIA.

RESISTANCE-REGULATING APPARATUS FOR ELECTRIC WELDING.

Application filed April 20, 1925. Serial No. 24,557.

My invention relates to resistance regulators for the circuits supplying current to electric arc welding apparatus, this application being a continuation in part of my application, which eventuated into Patent No. 1,534,288.

In welding with the electric arc it is important that the welding tool shall be supplied with just the right current for the particular work at hand. This varies with the thickness of the metal, size of the sheets to be welded and with the temperature of the shop. When a number of welders are operating upon different pieces of work it is best to have one man in charge of the welding panels which contain the regulating resistances and he should be able to see at a glance what current is being supplied to each welder. When changes of current are required, necessitated by a change in the work, he should be able to supply the proper values instantly.

I prefer to employ resistance units formed of grids and to vary the resistance included in the circuit by connecting directly to different parts of the grid units. The usual method of arranging a grid resistance is to locate the grid sections or rheostats behind a switch-board and to connect the grids by cables to a number of switches on the switchboard. Such a system is complicated and in case of a defect or break down in any of the grids, it requires a long time to make the repairs. In my system the grids are incorporated in the panel boards and they are so arranged that any grid may be removed without disturbing the others. Connections are made directly to different parts of the grid by means of a portable clamp switch attached to a flexible cable.

The resistance of the grid rheostat, which is preferably made of cast iron elements, increases when it becomes heated by the heavy flow of current and this causes a decrease of current. I overcome this objection to a large extent by employing carbon pile resistances in the current control apparatus, the latter decreasing in resistance as they become heated by the passage of the current, so that the increase in resistance of the iron grid is offset by the decrease in resistance of the carbon pile, thereby maintaining a substantially constant supply of current at the welding arc.

It is also desirable to introduce reactance into the welding circuit in conjunction with the resistance, the amount of reactance varying with the load characteristics.

In the further description of my invention I shall refer to the accompanying drawings in which:

Figures 1 and 2 are front elevations of grid resistance regulating panels embodying features of my invention; Figure 3 is an end elevation of the grid resistance panel shown in Fig. 2; Figure 4 is a perspective view of my portable clamp switch and showing the manner of connecting it to a grid or reactance contact lug; Figure 5 is a central longitudinal sectional view of the same; and Figures 6 and 7 are transverse sectional views on the lines 6—6 and 7—7, respectively, of Figure 4.

Each panel of the switch board or current regulating section is separately mounted and is independent of the others so that it can be immediately removed or replaced if necessary. As is well known, it has heretofore been customary to stack one section upon another which necessitates the removal of all of the upper sections in order to remove a lower section.

Each panel is supported upon end frame standards 2, 2', to which the angle brackets 5 are bolted. The rheostats or resistance sections are formed in the usual manner, of a plurality of grids 8 by threading their perforated hubs 8$^a$ upon supporting rods, and insulated therefrom by an interposed insulating sleeve illustrated more in detail in said prior application. The rods are connected by end frame bars 14. For the purpose of making direct connection with any grid element, I interpose between the hubs 8$^a$, contact washers or connectors 15, which are perforated, as indicated at 15$^a$ in Figure 4, so that they may be threaded upon the insulated rods. For the convenience of the attendant, these connector washers are provided with indicating tags 16 which are numbered consecutively for each panel. For the purpose of connecting the several rheostats in series, I provide at each end a washer 18, which carries a projecting connecting device 19, such as the well-known "Dossert" connector, to which the connecting rod or wire 20 is secured.

The upper part of the panel carries the main switch indicating instruments and automatic arc-controlling resistances which are mounted, as usual, upon slate slabs 25. For purposes of illustration, I have illustrated a simple manual switch 26, but it will be understood by engineers that a double pole, overload type may be employed. The ampere-meter 27 serves to indicate the location of the indicating instruments which preferably include a volt-meter, an ammeter and a recording volt-meter.

In Figure 1, I have shown a reactance coil 28 which may be connected in the welding circuit as required. It is desirable however, that the value of the reactance introduced at different times should vary to suit different conditions in the welding circuit. It is also desirable that larger or smaller portions of the carbon pile resistances, which are used in conjunction with the cast iron grid resistances, should be varied to suit different conditions in the welding operation. Thus under certain conditions, the current may be properly regulated by a small number of grid resistance sections and a proportionately larger value of reactance with a small amount of the carbon pile resistance in circuit. As a larger number of grid sections are required for a heavier current, less reactance may be required but a larger amount of the carbon pile sections will be required to compensate for the increase in resistance of the cast iron grids.

In order that varying values of reactance may be readily introduced into the welding circuit, I provide the reactance coil shown in Figure 2, having taps or contact lugs 15ª secured to the coils at intervals and projecting therefrom so that my clamp switch may be instantly attached to the proper lug to give the required reactance. While various forms of reactance coils may be employed, I prefer to wind the coil, as shown in Figure 2, with flat ribbon conductor wound upon the laminated core 30 edgewise, the coils or turns 31 being spaced to afford ventilation.

The carbon pile resistance may be constructed in the manner shown in Figure 2, of graphite disks 35, guided within a skeleton frame having end plates 36, 37 connected by insulated rods or bolts 38. The disks are compressed to a greater or less degree by means of a hand wheel 40 having a stem threaded through a nut 41 carried by the plate 37 and bearing against the movable pressure plate 42. While the amount of the resistance of the carbon pile may be varied within certain limits by changing the degree of pressure thereon, I have found that the range of variation may be very largely increased by providing a means for connecting varying portions of the graphite disks in circuit. For this purpose I insert metal plates 43 between the disks at intervals and provide the plates with contact lugs 45 to which the clamp switches may be attached.

I have devised a form of clamp switch illustrated in Figures 4 to 7, which has proven to be very efficient and absolutely reliable. The stationary member is provided with a wide jaw 50 having a rectangular recess with flanges upon either side to receive the projecting plate portion of the contact lug or washer 15, and with a depending connection, such as a "Dossert" connector 19 for attachment to a flexible cable. The movable member 51 is pivoted at 52 to the stationary member and carries upon its clamping end an oscillating jaw 53 pivoted on the bolt 54. The jaws are held with vise-like grip upon the contact plate by means of a strong spring 56 mounted between the handles.

I claim:—

1. Current regulating apparatus for arc-welding circuits, comprising a rheostat having a plurality of connected resistance-grids, a carbon pile resistance adapted to be connected in circuit with said rheostat, provided with contact members projecting therefrom at intervals, a flexible cable forming a part of the welding circuit and a clamp-switch secured to the free end of said cable and adapted to be clamped to any desired contact-member.

2. Current regulating apparatus as set forth in claim 1 and a flexible cable connector provided with a clamp-switch at each end so that one clamp-switch may be connected to one contact member while the other clamp-switch is changed from one member to another.

In testimony whereof I affix my signature.

ANDREW SMITH.